United States Patent
Bateham et al.

(10) Patent No.: US 10,543,539 B2
(45) Date of Patent: Jan. 28, 2020

(54) DRILLING AID APPARATUS AND A METHOD FOR DRILLING A STRUCTURE

(71) Applicant: Gulfstream Aerospace Corporation, Savannah, GA (US)

(72) Inventors: Jason Bateham, Savannah, GA (US); Fady Rafla, Savannah, GA (US); Steven Sanders, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/899,630

(22) Filed: Feb. 20, 2018

(65) Prior Publication Data

US 2019/0255626 A1 Aug. 22, 2019

(51) Int. Cl.
*B23B 47/28* (2006.01)
*B23B 49/02* (2006.01)

(52) U.S. Cl.
CPC ........ *B23B 47/287* (2013.01); *B23B 49/023* (2013.01); *B23B 2247/12* (2013.01); *Y10T 408/567* (2015.01)

(58) Field of Classification Search
CPC . B23B 2247/00; B23B 2247/12; B23B 47/28; B23B 47/287; B23B 47/288; B23B 49/023; Y10T 408/567; Y10T 408/568; Y10T 408/569
See application file for complete search history.

(56) References Cited

U.S. PATENT DOCUMENTS

| | | | | |
|---|---|---|---|---|
| 1,210,942 A * | 1/1917 | Jones | ...................... | B23B 47/28 408/104 |
| 2,260,784 A * | 10/1941 | Morton | ................. | B23B 47/288 144/92 |
| 2,426,124 A * | 8/1947 | Skwierawski | .......... | B23B 47/28 33/628 |
| 2,669,889 A * | 2/1954 | Huller | ..................... | B23B 47/34 408/17 |
| 3,065,654 A * | 11/1962 | Critelli | ................. | B25H 1/0078 144/136.95 |
| 4,306,823 A * | 12/1981 | Nashlund | .............. | B23B 47/287 144/144.52 |
| 4,601,618 A * | 7/1986 | McEldowney | ......... | B23B 47/28 408/1 R |

(Continued)

FOREIGN PATENT DOCUMENTS

GB 2257644 A * 1/1993 ............. B23B 47/28

*Primary Examiner* — Eric A. Gates
*Assistant Examiner* — Chwen-Wei Su
(74) *Attorney, Agent, or Firm* — LKGlobal | Lorenz & Kopf, LLP

(57) ABSTRACT

Drilling aid apparatuses and methods for drilling a structure are provided. In one example, a drilling aid apparatus includes a bushing holder portion. The bushing holder portion has a first surface for facing a first structure portion, a second surface on a side opposite the first surface, and an opening formed through the bushing holder portion extending from the first surface to the second surface. The opening is configured to receive a bushing that is sized for guiding a drill bit for drilling into the first structure portion. A first coupling member is coupled to the bushing holder portion and is configured to couple to a second structure portion for supporting the bushing holder portion in a fixed position relative to the first structure portion.

19 Claims, 2 Drawing Sheets

(56) References Cited

U.S. PATENT DOCUMENTS 5,054,969 A * 10/1991 Gibson ................ B23B 47/288
                                                                     33/638
9,370,828 B2 * 6/2016 Adkins ................ B23B 47/288

* cited by examiner

DRILLING AID APPARATUS AND A METHOD FOR DRILLING A STRUCTURE

TECHNICAL FIELD

The technical field relates generally to drilling, and more particularly, relates to drilling aid apparatuses that include a bushing holder and methods for drilling a structure using such drilling aid apparatuses.

BACKGROUND

In the aircraft industry, aircraft are commonly built by assembling barrel sections together to form a fuselage. The barrel sections are coupled together at the end portions of the barrels (e.g., spliced sections of the barrels) in which each barrel section may include a bulkhead structure with one or more layers of stacked outer sheets attached to the outer section of the bulkhead. Where adjacent spliced sections of the barrel sections interface, there can be significantly more layers of stacked outer sheets in which to fasten to the bulkhead outer section(s).

Typically, near the spliced section of a barrel section, there is a pilot hole in the bulkhead that may be, for example, machined in the interior surface of the bulkhead outer section. The pilot hole is used as a location guide for drilling through the bulkhead outer section and into layers of stacked outer sheets to form an opening therethrough for fastening. A series of bushings with stepwise increases in inner diameter (ID) may be used with corresponding drill bits with stepwise increases in outer diameter (OD) to assist in drilling through the pilot hole including the bulkhead outer section and the layers of stacked outer sheets to form a desired sized OD opening for fastening.

Bulkhead structures are typically machined and unfortunately there can be considerable part to part variation including variation in the location of the pilot holes. Additionally, there is often limited working space between the interior webs of the bulkhead and the bulkhead outer structure for drilling through the pilot hole. As such, it can be challenging to consistently align each of the bushings in a series of bushings with stepwise increases in ID as an aid for drilling, and to consistently drill "true" and "round" through the pilot hole, the bulkhead outer section, and the adjacent layers of stacked outer sheets to form a desired sized OD opening therethrough for fastening.

Accordingly, it is desirable to provide an improved drilling aid and a method for drilling using such a drilling aid that overcome some or all of the foregoing issues. Furthermore, other desirable features and characteristics of the various embodiments described herein will become apparent from the subsequent detailed description and the appended claims, taken in conjunction with the accompanying drawings and this background.

SUMMARY

Drilling aid apparatuses and methods for drilling a structure are provided herein. In accordance with an exemplary embodiment, a drilling aid apparatus includes a bushing holder portion. The bushing holder portion has a first surface for facing a first structure portion, a second surface on a side opposite the first surface, and an opening formed through the bushing holder portion extending from the first surface to the second surface. The opening is configured to receive a bushing that is sized for guiding a drill bit for drilling into the first structure portion. A first coupling member is coupled to the bushing holder portion and is configured to couple to a second structure portion for supporting the bushing holder portion in a fixed position relative to the first structure portion.

In another exemplary embodiment, a drilling aid apparatus includes a bushing holder portion. The bushing holder portion has a first surface for facing a first structure portion that has a pilot hole formed at least partially therethrough, a second surface on a side opposite the first surface, and an opening formed through the bushing holder portion extending from the first surface to the second surface. A first coupling member and a second coupling member are coupled to the bushing holder portion and extend in different directions. The first and second coupling members are cooperatively configured to adjustably couple to different structure portions so that the opening of the bushing holder portion is substantially aligned with the pilot hole of the first structure portion. The opening is configured to receive a bushing that is sized for guiding a drill bit for drilling through the pilot hole into the first structure portion.

In accordance with an exemplary embodiment, a method for drilling a first structure portion is provided. The method includes positioning a bushing holder portion adjacent to the first structure portion. The bushing holder portion has an opening formed therethrough. A first coupling member extending from the bushing holder portion is coupled to a second structure portion for supporting the bushing holder portion in a fixed position relative to the first structure portion. A bushing has a bushing opening extending therethrough and is disposed into the opening of the bushing holder portion. A drill bit is advanced through the bushing opening to guide the drill bit to the first structure portion. The drill bit is rotated to drill into the first structure portion.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
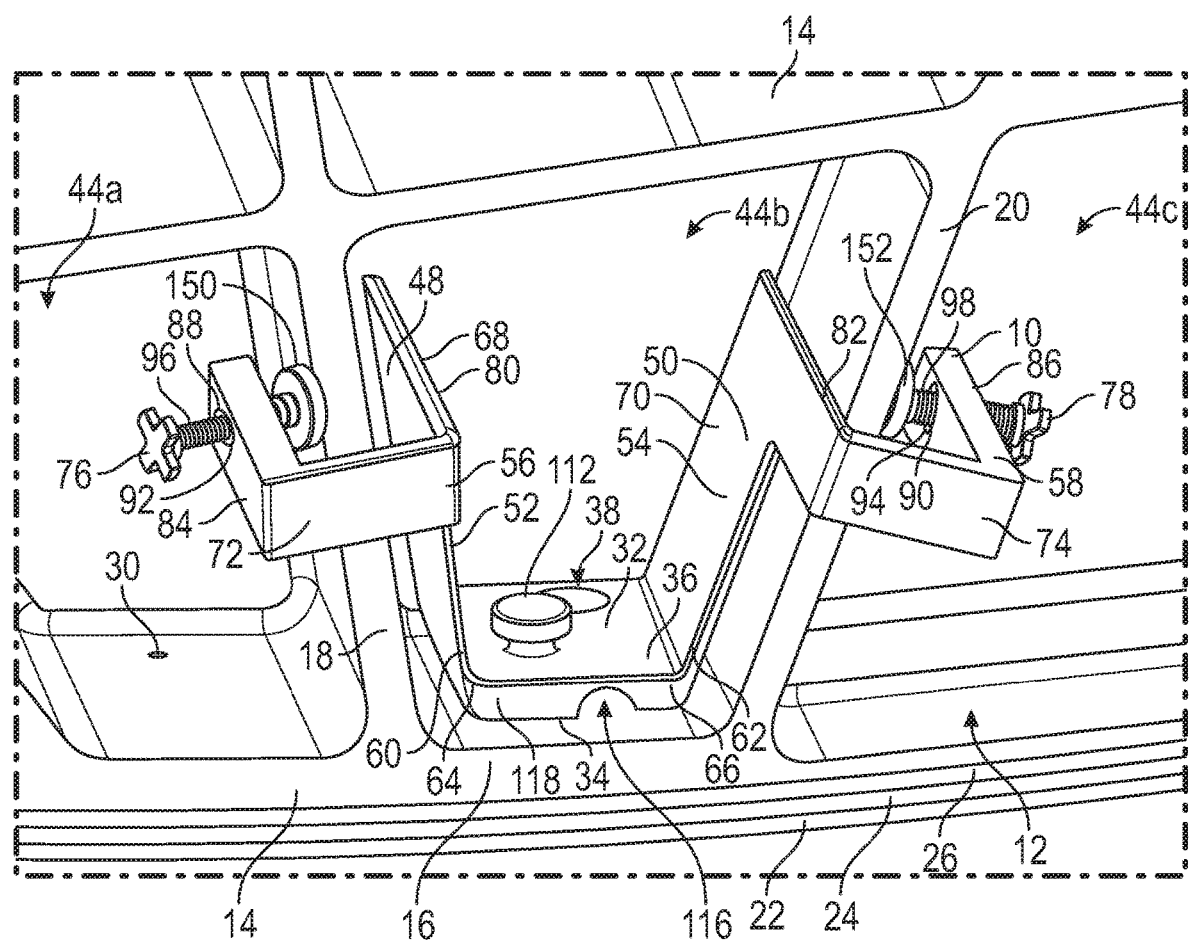
FIG. 1 illustrates a perspective view of a drilling aid apparatus in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to drilling aid apparatuses and methods for drilling a structure. The exemplary embodiments taught herein provide a drilling aid apparatus that includes a bushing holder portion. The bushing holder portion has an opening formed therethrough for receiving a bushing that is sized for guiding a drill bit for drilling into a first structure portion. In one example, the first structure portion is an outer section of a bulkhead structure that includes a pilot hole and has one or more layers of outer sheets stacked thereon for attachment to the outer section of the bulkhead.

The drilling aid apparatus further includes a first coupling member that is coupled to the bushing holder portion and is configured for coupling to a second structure portion for supporting the bushing holder portion in a fixed position relative to the first structure portion. In one example, the second structure portion is an interior web section of the bulkhead structure. In an exemplary embodiment, the first coupling member includes a frame and an adjustment element that is movably coupled to the frame to allow the adjustment element to be spatially adjusted or repositioned for engagement with the second structure portion such that the opening of the bushing holder portion is or becomes substantially aligned with the pilot hole of the first structure when in the fixed position.

In an exemplary embodiment, a bushing, which has a bushing opening extending therethrough with a predetermined ID, is arranged into the opening of the bushing holder portion. The bushing may be one in a series of bushings with stepwise increasing predetermined IDs. A drill bit with a predetermined OD that substantially matches the predetermined ID of the bushing opening is advanced through the bushing opening to guide the drill bit to the first structure portion. The drill bit may be one in a series of drill bits with stepwise increasing predetermined ODs. The drill bit is rotated for drilling through the pilot hole and into the first structure portion to form an opening with an OD that substantially matches the predetermined OD of the drill bit. In an exemplary embodiment, another bushing with a stepwise increase in predetermined ID from the series of bushings replaces the bushing in the bushing holder portion and is used for guiding another drill bit with corresponding stepwise increase in predetermined OD for drilling into the opening of the first structure to increase the OD of the opening. This process may be repeated one or more times with one or more additional bushings with stepwise increases in predetermined IDs from the series of bushings with corresponding drill bits with stepwise increases in predetermined ODs for drilling into the opening of the first structure to increase the opening size until a desired sized OD opening is formed for fastening through the first structure portion.

In an exemplary embodiment, it has been found that by using a coupling member that adjustably couples to a second structure portion, the position of the bushing holder portion can be spatially adjusted relative to the first structure so that the opening of the bushing holder portion is or becomes substantially matched and/or aligned with pilot hole. This allows one or more bushings in a series of bushings with stepwise increases in predetermined ID to be sequentially arranged in the opening of the bushing holder for guiding corresponding drill bit with stepwise increases in predetermined ODs for consistently drilling "true" and "round" openings through the pilot hole and the first structure regardless of any part to part variations.

FIG. 1 illustrates a perspective view of a drilling aid apparatus 10 in accordance with an exemplary embodiment. As illustrated, in a non-limiting example, the drilling aid apparatus 10 is arranged in an end portion of a barrel section 12 that may be assembled together with other barrel sections to form a fuselage for an aircraft. The barrel section 12 includes a bulkhead structure 14 that includes an outer structure portion 16 (e.g., first structure portion) and interior web structure portions 18 and 20 (e.g., first and second structural portions) that are coupled to and support the outer structure portion 16. A plurality of pockets 44a, 44b, and 44c are defined (e.g., machined or otherwise formed into the bulkhead structure 14) in the bulkhead interior spaces between the interior web structure portions including the pocket 44b that is disposed in the bulkhead interior space between the interior web structure portions 18 and 20 and the outer structure portion 16. One or more layers of stacked outer sheets 22, 24, and 26, which form a portion of the skin of the fuselage, are supported by and disposed adjacent to the outer surface of the outer structure portion 16 of the bulkhead structure 14.

Figure 2:
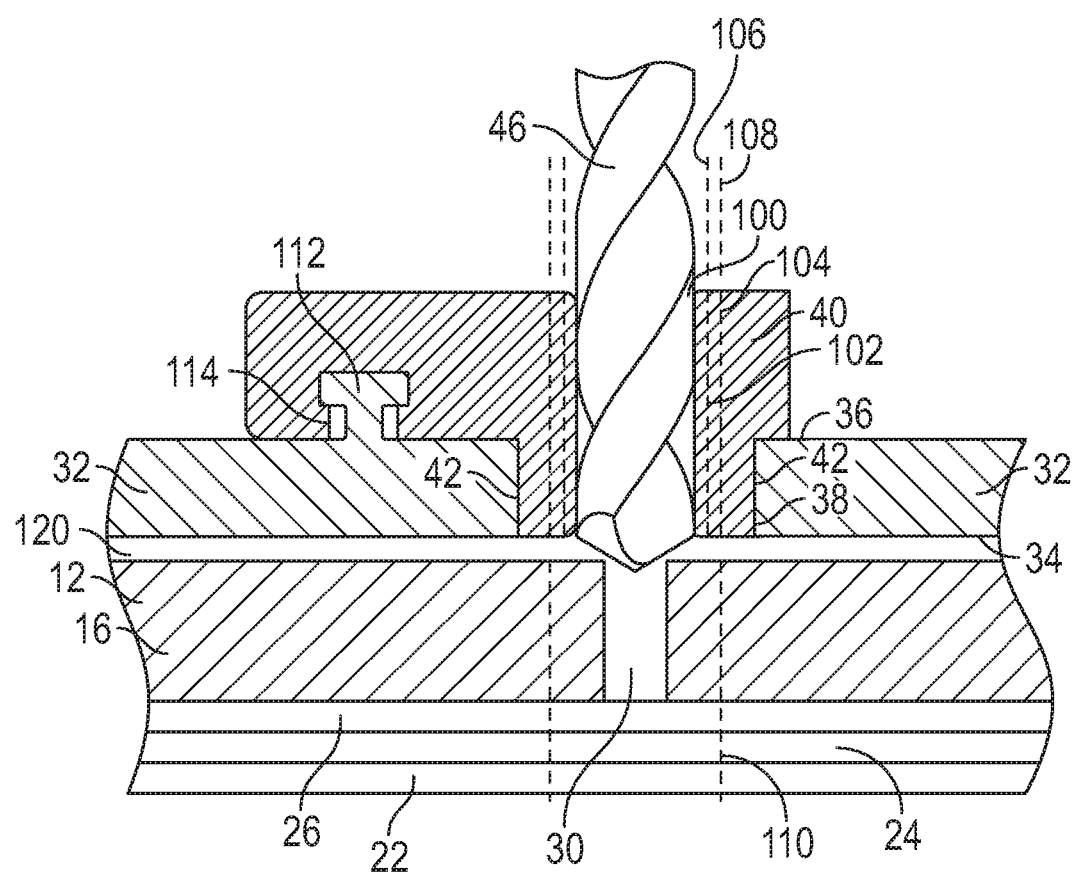
FIG. 2 illustrates a partial sectional view of a drilling aid apparatus including a bushing and a drill bit in accordance with an exemplary embodiment.

Referring also to FIG. 2, pilot holes 30 are machined or otherwise formed at various positions into the interior surface of the outer structure portion 16 of the bulkhead structure 14 adjacent to the pockets 44a, 44b, and 44c. The pilot holes 30 are used as locator guides for drilling through the outer structure portion 16 and into the layers of stacked outer sheets 22, 24, and 26 to form openings therethrough for fastening the stacked outer sheets 22, 24, and 26 to the bulkhead structure 14.

As illustrated, the drilling aid apparatus 10 is disposed in the pocket 44b and includes a bushing holder portion 32 that is disposed adjacent to the outer structure portion 16 overlying the associated pilot hole 30. The bushing holder portion 32 has a surface 34 facing the interior surface of the outer structure portion 16, a surface 36 on a side opposite the surface 34, and an opening 38 formed through the bushing holder portion 32 extending from the surface 34 to the surface 36. As illustrated, the opening 38 is configured for receiving a bushing 40 that is supported in position by the sidewalls 42 and the surface 36 of the bushing holder portion 32. As will be discussed in further detail below, the bushing 40 is sized for guiding a drill bit 46 for drilling through the pilot hole 30 into the outer structure portion 16.

Coupling members 48 and 50 are coupled to the bushing holder portion 32 and extend therefrom for coupling to the interior web structure portions 18 and 20, respectively, for supporting the bushing holder portion 32 in a fixed position relative to the outer structure portion 16. In an exemplary embodiment, the coupling members 48 and 50 include elongated member portions 52 and 54 that have end sections 60 and 62 coupled to opposing edge sections 64 and 66 of the bushing holder portion 32. As illustrated, the elongated member portions 52 and 54 extend generally upward from the bushing holder portion 32, flaring away from each other, in different directions into the bulkhead interior space of the pocket 44b correspondingly towards the interior web structure portions 18 and 20.

Clamping portions 56 and 58 of the coupling members 48 and 50 are coupled to the elongated member portions 52 and 54 and are configured to correspondingly couple to the interior web structure portions 18 and 20. The clamping portions 56 include frames 72 and 74 that are coupled to distal end sections 68 and 70, respectively, of the elongated member portions 52 and 54.

In an exemplary embodiment and as illustrated, the frames 72 and 74 each have a substantially "U-shaped" configuration. The substantially "U-shaped" configurations have inboard legs 80 and 82 that are disposed along inboard sides of the frames 72 and 74 and outboard legs 84 and 86 that are disposed along outboard sides of the frames 72 and 74. As such, the clamping portions 56 and 58 are positioned such that the interior web structure portion 18 is disposed between the inboard leg 80 and the outboard leg 84 of the frame 72 and the interior web structure portion 20 is disposed between the inboard leg 82 and the outboard leg 86 of the frame 74.

Further, the frames 72 and 74 are size such that gaps are present between the interior web structure portion 18 and each of the inboard and outboard legs 80 and 84, and between the interior web structure portion 20 and each of the inboard and outboard legs 82 and 86. This in combination with the open ends of the "U-shaped" configurations allows the frames 72 and 74 to be moved fore and aft and side to side in the pocket 44b relative to the interior web structure portions 18 and 20 to correspondingly move the bushing holder portion 32 relative to the outer structure portion 16 of the bulkhead structure 14 and the pilot hole 30.

Adjustment elements 76 and 78 are movably coupled to the frames 72 and 74 so that the adjustment elements 76 and 78 can be moved, repositioned, or otherwise spatially adjusted for engagement with the interior web structure portions 18 and 20 to support the bushing holder portion 32 in the fixed position such that the opening 38 of the bushing holder portion 32 is substantially aligned with the pilot hole 30. For example, the drilling aid apparatus 10 may be manually moved fore and aft and side to side in the pocket 44b relative to the interior web structure portions 18 and 20 such that the opening 38 of the bushing holder portion 32 is substantially aligned with the pilot hole 30 in the outer structure portion 16 of the bulkhead structure 14. Next, the adjustment elements 76 and 78 may be manually adjusted for engagement with the interior web structure portions 18 and 20 to fix and support the bushing holder portion 32 in the fixed position.

In an exemplary embodiment, the frames 72 and 74 have threaded wall sections 88 and 90 that at least partially surround apertures 92 and 94 formed through the outboard legs 84 and 86 of the frames 72 and 74. The adjustment elements 76 and 78 include threaded positive features 96 and 98 (e.g., threaded portions of thumbscrews or the like) that are correspondingly movably engaged or mesh with the threaded wall sections 88 and 90 of the outboard legs 84 and 86 to move the threaded positive 96 and 98 feature axially in the apertures 92 and 94. As such, the adjustment elements 76 and 78 can be independently rotated clockwise or counterclockwise to advance the threaded positive features 96 and 98 axially for engagement with the interior web structure portions 18 and 20 to secure the drilling aid apparatus 10 in the fixed position. In an exemplary embodiment, coupled to the ends of the threaded positive features 96 and 98 are pads 150 and 152 that directly contact the interior web structure portions 18 and 20. Advantageously, the surface area of the pads 150 and 152 is greater than the surface area of the ends of the threaded positive features 96 and 98 to better enhance or secure the drilling aid apparatus 10 in the fixed position. Additionally, the increased surface area of the pads 150 and 152 helps to prevent scratching of the interior web structure portions 18 and 20.

As discussed above, the bushing 40 is arranged into the opening 38 of the bushing holder portion 32. In an exemplary embodiment, the bushing 40 has a bushing opening 100 extending therethrough with a predetermined ID that is substantially concentric with the opening 38 of the bushing holder portion 32. As such, when the bushing holder portion 32 is in the fixed position, the bushing opening 100 is substantially aligned with the pilot hole 30. The bushing 40 may be one in a series of bushings with stepwise increasing predetermined IDs. The drill bit 46 has a predetermined OD that substantially matches the predetermined ID of the bushing opening 100 such that the drill bit 46 can be advanced substantially axially through the bushing opening 100 towards the pilot hole 30. The drill bit 46 may be one in a series of drill bits with stepwise increasing predetermined ODs. The drill bit 46 is rotated for drilling through the pilot hole 30 and into the outer structure portion 16 and the stacked outer sheets 24 to form an opening with an OD that substantially matches the predetermined OD of the drill bit 46.

In an exemplary embodiment, one or more other bushings with stepwise increases in predetermined IDs (indicated by single headed arrows 102 and 104) from the series of bushings may be used to replace the bushing 40 in the bushing holder portion 32 for use in guiding one or more other drill bits with corresponding stepwise increases in predetermined OD (indicated by single headed arrows 106 and 108) for drilling through the outer structure portion 16 and the stacked outer sheets 24. This process may be continued or otherwise be repeated to increase the opening size to form a desired sized OD opening (indicated by single headed arrow 110) for fastening the stacked outer sheets 24 to the outer structure portion 16 of the bulkhead structure 14.

In an exemplary embodiment, the bushing holder portion 32 has a bushing engagement feature 112 (button feature, mushroom feature, or the like) proximate to the opening 38 and projecting from the surface 36 for releasably engaging with the bushing 40 to help retain the bushing 40 in the opening 38 during use. For example, the bushing 40 may include a groove or open and/or tapered channel 114 that is configured to receive and releasably engage the bushing engagement feature 112, such as by positioning the bushing 40 on the bushing holder portion 32 with the bushing engagement feature 112 disposed in the groove or open and/or tapered channel 114, and then rotating the bushing 40 either clockwise or counterclockwise to releasably lock the bushing 40 in place.

In an exemplary embodiment, the bushing holder portion 32 has a drilling chip relief channel 116 formed along the surface 34 between the opening 38 and a lateral edge section 118 of the bushing holder portion 32. The drilling chip relief channel 116 is sized or otherwise configured to allow drilling chips, which are produced from drilling through the outer structure portion 16 and the stacked outer sheets 24 with the drill bit 46, to be advanced through the drilling chip relief channel 116 towards the lateral edge section 118 of the bushing holder portion. Advantageously this prevents any build-up of drilling chips between the bushing holder portion 32 and the outer structure portion 16 during drilling into the outer structure portion 16 and the stacked outer sheets 24.

In an exemplary embodiment and as illustrated, the coupling members 48 and 50 support the bushing holder portion 32 spaced apart from the outer structure portion 16 to define a gap 120 between the surface 34 of the bushing holder portion 32 and the outer structure portion 16. Advantageously, supporting the bushing holder portion 32 spaced apart from the outer structure portion 16 facilitates adjusting the position of the bushing holder portion 32 so as to align the opening 38 with the pilot hole 28 without interference with the outer structure portion 16, thereby reducing the possibility of scratching the outer structure portion 16. In an exemplary embodiment, the gap 120 is from about 1 to about 5 mm. Alternatively, the bushing holder portion 32 can rest directly on or be flush with the outer structure portion 16 as in some cases this may facilitate aligning the opening 38 with the pilot hole 28.

Figure 3:
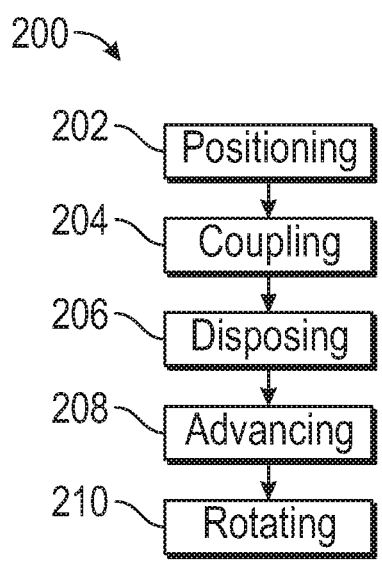
FIG. 3 illustrates a method for drilling a structure portion in accordance with an exemplary embodiment.

Referring to FIG. 3, a method 200 for drilling a first structure is provided. The method 200 includes positioning (STEP 202) a bushing holder portion adjacent to the first structure portion. The bushing holder portion has an opening formed therethrough. A first coupling member extending from the bushing holder portion is coupled (STEP 204) to a second structure portion for supporting the bushing holder portion in a fixed position relative to the first structure portion. A bushing having a bushing opening extending therethrough is disposed (STEP 206) into the opening of the bushing holder portion. A drill bit is advanced (STEP 208) through the bushing opening to guide the drill bit to the first structure portion. The drill bit is rotated (STEP 210) to drill into the first structure portion.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A drilling aid apparatus comprising:
    a bushing holder portion having a first surface for facing a first structure portion, a second surface on a side opposite the first surface and facing upward away from the bushing holder portion, and an opening formed through the bushing holder portion extending from the first surface to the second surface, wherein the opening is configured to receive a bushing that is sized for guiding a drill bit for drilling into the first structure portion, wherein the bushing holder portion has a drilling chip relief channel formed along the first surface extending between the opening and a lateral edge section of the bushing holder portion, and wherein the drilling chip relief channel is configured to allow drilling chips formed from drilling the first structure portion with the drill bit to be advanced through the drilling chip relief channel towards the lateral edge section of the bushing holder portion; and
    a first coupling member coupled to the bushing holder portion and extending generally upward exposed to the second surface, and wherein the first coupling member is configured to couple to a second structure portion for supporting the bushing holder portion in a fixed position relative to the first structure portion.

2. The drilling aid apparatus of claim 1, wherein the first coupling member comprises:
    an elongated member portion that is coupled to the bushing holder portion; and
    a clamping portion that is coupled to the elongated member portion and that is configured to couple to the second structure portion.

3. The drilling aid apparatus of claim 2, wherein the clamping portion includes:
    a frame coupled to the elongated member portion; and
    an adjustment element movably coupled to the frame to allow the adjustment element to be spatially adjusted for engagement with the second structure portion and for the first coupling member to support the bushing holder portion in the fixed position.

4. The drilling aid apparatus of claim 3, wherein the frame has a substantially "U-shaped" configuration.

5. The drilling aid apparatus of claim 3, wherein the frame has a threaded wall section that at least partially surrounds an aperture formed through the frame, and wherein the adjustment element comprises a threaded positive feature that meshes with the threaded wall section to move the threaded positive feature axially in the aperture.

6. The drilling aid apparatus of claim 2, wherein the bushing holder portion has an edge section, and the elongated member portion has a first end section that is coupled to the edge section of the bushing holder portion and a second end section that is coupled to the clamping portion.

7. The drilling aid apparatus of claim 1, further comprising a second coupling member coupled to the bushing holder portion and configured to couple to a third structure portion for supporting the bushing holder portion in the fixed position.

8. The drilling aid apparatus of claim 1, wherein the bushing holder portion has a bushing engagement feature proximate to the opening projecting from the second surface for releasably engaging with the bushing to help retain the bushing in the opening.

9. The drilling aid apparatus of claim 1, wherein the first coupling member is configured to couple to the second structure portion for supporting the bushing holder portion in the fixed position spaced apart from the first structure portion to define a gap between the first surface of the bushing holder portion and the first structure portion.

10. The drilling aid apparatus of claim 9, wherein the gap is from about 1 to about 5 mm.

11. A drilling aid apparatus comprising:
    a bushing holder portion having a first surface for facing a first structure portion that has a pilot hole formed at least partially therethrough, a second surface on a side opposite the first surface and facing upward away from the bushing holder portion, and an opening formed through the bushing holder portion extending from the first surface to the second surface; and
    a first coupling member and a second coupling member that are coupled to the bushing holder portion and extend in different directions but generally upward exposed to the second surface, wherein the first and second coupling members are cooperatively configured to adjustably couple to different structure portions so that the opening of the bushing holder portion is substantially aligned with the pilot hole of the first structure portion, and wherein the opening is configured to receive a bushing that is sized for guiding a drill bit for drilling through the pilot hole into the first structure portion, wherein the bushing holder portion has a drilling chip relief channel formed along the first surface extending between the opening and a lateral edge section of the bushing holder portion, and wherein the drilling chip relief channel is configured to allow drilling chips formed from drilling the first structure portion with the drill bit to be advanced through the drilling chip relief channel towards the lateral edge section of the bushing holder portion.

12. The drilling aid apparatus of claim 11, wherein the first coupling member includes:
    a first elongated member portion that is coupled to the bushing holder portion; and
    a first clamping portion that is coupled to the first elongated member portion and that is configured to couple to a second structure portion, and wherein the second coupling member includes:
    a second elongated member portion that is coupled to the bushing holder portion; and
    a second clamping portion that is coupled to the second elongated member portion and that is configured to couple to a third structure portion.

13. The drilling aid apparatus of claim 12, wherein the first and second coupling members extend generally upward from the bushing holder portion.

14. The drilling aid apparatus of claim 13, wherein the first and second coupling members extend generally upward from the bushing holder portion in directions that generally flare away from each other.

15. The drilling aid apparatus of claim 12, wherein the first clamping portion includes:
a first frame coupled to the first elongated member portion; and
a first adjustment element movably coupled to the first frame, and wherein the second clamping portion includes:
a second frame coupled to the second elongated member portion; and
a second adjustment element movably coupled to the second frame, and wherein the first and second adjustment elements are configured to be cooperatively spatially adjusted for engagement with the second and third structure portions, respectively, so that the opening of the bushing holder portion is substantially aligned with the pilot hole of the first structure portion.

16. The drilling aid apparatus of claim 15, wherein the first frame has a first substantially "U-shaped" configuration having a first inboard leg and a first outboard leg and the second frame has a second substantially "U-shaped" configuration having a second inboard leg and a second outboard leg, and wherein the first and second inboard legs are disposed along inboard sides of the first and second substantially "U-shaped" configurations, respectively, and the first and second outboard legs are disposed along outboard sides of the first and second substantially "U-shaped" configurations, respectively.

17. The drilling aid apparatus of claim 16, wherein the first adjustment element and the second adjustment element are movably coupled to the first and second outboard legs, respectively.

18. The drilling aid apparatus of claim 11, wherein the bushing holder portion has a first edge section and a second edge section on a side opposite the first edge section, and wherein the first coupling member extends generally upward from the first edge section and the second coupling member extends generally upward from the second edge section.

19. A method for drilling a first structure portion, the method comprising the steps of:
positioning a bushing holder portion adjacent to the first structure portion, wherein the bushing holder portion has an opening formed therethrough, wherein the bushing holder portion has a first surface facing the first structure portion, a second surface on a side opposite the first surface and facing upward away from the bushing holder portion;
coupling a first coupling member extending from the bushing holder portion to a second structure portion for supporting the bushing holder portion in a fixed position relative to the first structure portion, wherein the first coupling member extends generally upward exposed to the second surface;
disposing a bushing having a bushing opening extending therethrough into the opening of the bushing holder portion;
advancing a drill bit through the bushing opening to guide the drill bit to the first structure portion; and
rotating the drill bit to drill into the first structure portion, wherein the bushing holder portion has a drilling chip relief channel formed along the first surface extending between the opening and a lateral edge section of the bushing holder portion, and wherein the drilling chip relief channel is configured to allow drilling chips formed from drilling the first structure portion with the drill bit to be advanced through the drilling chip relief channel towards the lateral edge section of the bushing holder portion.

\* \* \* \* \*